(No Model.)
N. H. EDGERTON.
STORAGE BATTERY AND METHOD OF MAKING SAME.
No. 541,081. Patented June 18, 1895.
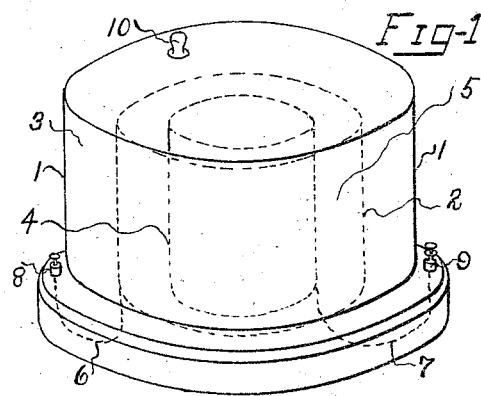
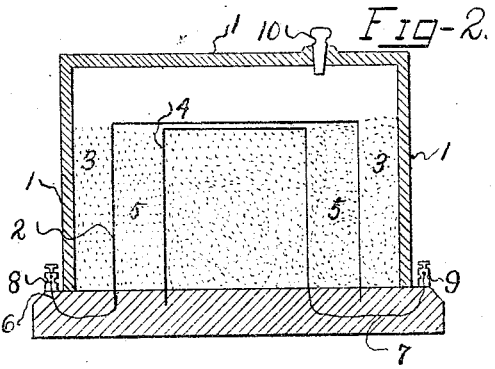
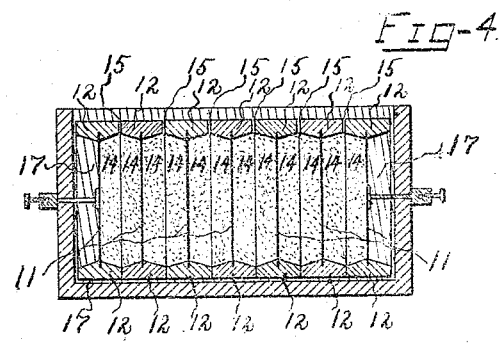
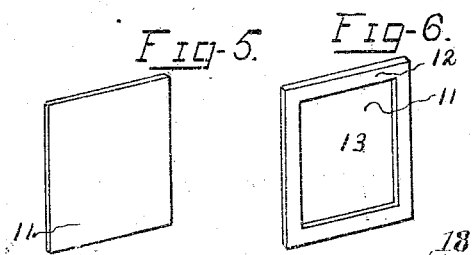
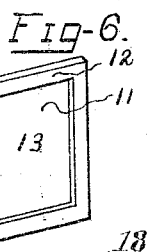
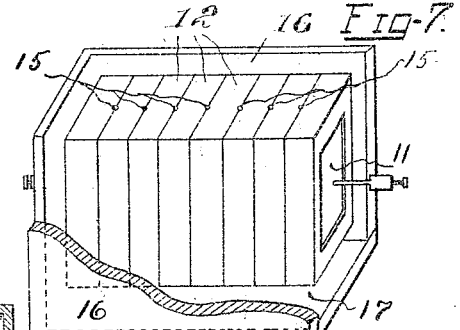
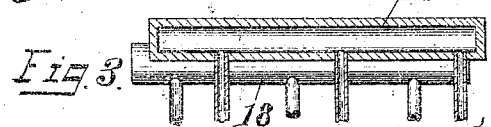
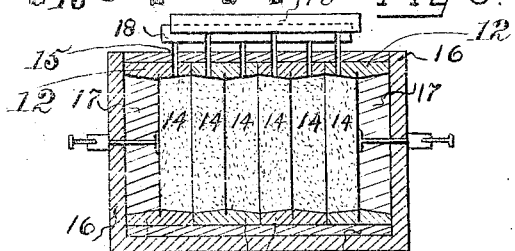
WITNESSES:
INVENTOR
Nathan H. Edgerton

UNITED STATES PATENT OFFICE.

NATHAN H. EDGERTON, OF WEST WHITELAND, PENNSYLVANIA.

STORAGE-BATTERY AND METHOD OF MAKING SAME.

SPECIFICATION forming part of Letters Patent No. 541,081, dated June 18, 1895.

Application filed February 27, 1894. Serial No. 501,750. (No model.)

*To all whom it may concern:*

Be it known that I, NATHAN H. EDGERTON, a citizen of the United States, residing at West Whiteland, in the county of Chester and State of Pennsylvania, have invented certain new and useful Improvements in Secondary or Storage Batteries and the Method or Process of Making the Same; and I do hereby declare the following to be a sufficiently full, clear, and exact description thereof as to enable others skilled in the art to make and use the said invention.

This invention relates to secondary or storage batteries, and more especially to that class of batteries in which the reunion of the evolved or previously engaged gases effects or attends the reflow of electric current, than to those in which the development of electric energy results from the affinity and changes in what has been termed in the art "active material."

The object of this invention is the reduction of weight, by substituting to a large extent the use of very light, and compressible gases evolved from the electrolyte by the charging current, for the heavy lead oxides used in the Brush and Faure batteries. To render this feature of the invention practicable it is requisite to have the receptacles in which the gases are liberated of sufficient strength to resist their elastic force in order to store, and retain them; and the process or method by which such receptacles, having fluid tight non-conducting walls, capable of withstanding the strain and the chemical action of the electrolytic fluid are made, forms an important part of this invention. Uniform action is promoted by applying a thin layer or surface covering of comminuted metal to the conducting surfaces.

The accompanying drawings show batteries constructed in accordance with this invention, in completed form, and in separate parts in course of construction.
Figure 1 shows a perspective view of a single cell of such a battery made in a cylindric form; Fig. 2, a vertical central section thereof. Fig. 3 is an enlarged detached view of the gas-receptacles; Fig. 4, a vertical section thereof; Fig. 5, a perspective view of one of the plates or conducting septs of such battery; Fig. 6, a perspective view of the plate shown in Fig. 5, with a non-conducting rim formed on it; Fig. 7, a number of such plates with frames assembled in readiness to cement together in a case, the case being shown in partial section. Fig. 8 shows a vertical section of a modification of the battery in which the gases are stored in auxiliary receptacles.

Referring to Figs. 1 and 2 of the drawings, 1, represents a cylindric case of non-conducting material; 2, a cylindric conducting shell fitted therein to the bottom of the case 1, with an annular space 3 between it and the case 1; 4, a smaller cylindric conducting shell also fitted to the bottom of the case 1, with an annular space 5 between it and the shell 2. Both shells 2 and 4, are open at the upper end. The said shells are composed of any material that has electric conducting properties, such as copper, silver, tin, lead, carbon or platinized silver, the latter being preferable. Each shell 2 and 4 is respectively provided with an insulated electrical conductor extending to a binding post 8 or 9. The annular spaces 3 and 5, around and within the shells 2 and 4, are fitted with a material susceptible of containing an electrolyte. This may be an absorbent or a gelatinous mass and should be permeable to gases. An aperture in the case 1, serves to introduce an electrolytic fluid and is closed by a stopper 10. The upper part of the case becomes a receptacle for gases disengaged from the electrolyte when an electric current is passed from a generator through the binding posts 8 and 9, conductors 6 and 7, the shells 2, 4 and electrolyte in contact therewith. Upon disconnecting the binding posts from the generator and electrically connecting them through any apparatus requiring current, a reversed current is established, attended with a reversal of the chemical decomposition or change that had previously been produced in the electrolyte.

Referring to the views, Figs. 3 to 7 inclusive, 11 represents a conducting plate preferably of material not susceptible of rapid corrosion, a lead plate being preferable; 12, a frame molded around the edges thereof forming a plastic non-conductor, a compound of gutta percha, sulphur, resin and talc answering the purpose. The plate 11 and frame 12, are united, presenting the form shown in Fig. 6, in which it will be seen that a sunken panel 13 is formed on each side of the plate 11 within the frame 12. Several of the frames 12, with their plates are assembled in close contact, and filled with an absorbent material 14, composed preferably of asbestos. An aperture 15, is made through each frame 12 by which an electrolytic fluid preferably composed of acidulated water may be introduced, as shown in Fig. 8; or the apertures may be made between the frames as shown in Fig. 4. The assembled plates 11, and frames 12, are placed in a strong box 16, and the space around them filled with a fusible or plastic compound 17, having non-conducting properties which cements the frames together and forms an inclosing insulating case, the said compound 17 being preferably composed of rosin, linseed-oil, and sulphur. Conductors are applied to the terminal plates 11, of the series by which currents are introduced from generators and discharged for use.

The case 16 is made most conveniently of dry wood, strongly dovetailed and cemented, and screwed together, but any box of strength sufficient to retain the gases generated answers the purpose.

Supplemental receptacles 18, for gases may be connected as shown in Fig. 8, and when exhausted replaced by others containing fresh charges, or such fresh charge may be introduced by tubular connection with an otherwise independent source of supply.

The chemical affinity of the gases as disturbed by the changing current of electricity in these batteries is the source of their energy in discharging. The pulverulent metallic coating of the conductors improves the efficiency of the conducting surface.

Having described my invention, what I claim is—

1. The method or process of making secondary or storage batteries, consisting essentially of molding or otherwise forming rims, or frames of non-conducting material upon the edges of conducting plates, and thereby forming a cell on each side of said plate, next filling said cells with a permeable mass, capable of retaining an electrolytic fluid, then placing said cells and frames against each other so as to close contiguous cells one with the other with the exception of a small aperture; then molding and cementing the assembled cells together with an envelope of plastic cement within a retaining case and finally introducing a charge of electrolytic fluid into each cell, and sealing the same therein, and applying conductors to the terminal plates, substantially as set forth and described.

2. In a secondary, or storage battery a series of cells with intervening conducting partitions and surrounding non-conducting frames molded thereon, the said cells filled with a permeable material, charged with an electrolytic fluid, and the terminal partitions, having conductors connected therewith, in combination with an envelope of plastic non-conducting material in an inclosing case adapted to retain the gaseous elements evolved in the charging and discharging of electric currents, through the series of cells, substantially as set forth.

NATHAN H. EDGERTON.

Witnesses:
J. DANIEL EBY,
LACEY L. CADWALLADER.